United States Patent [19]

Obkircher

[11] Patent Number: 5,400,134
[45] Date of Patent: Mar. 21, 1995

[54] DEVICE WITH INFRARED SEARCH HEAD FOR DETECTION AND ENGAGEMENT OF ENEMY HELICOPTERS

[75] Inventor: Bernt Obkircher, Aufham, Germany

[73] Assignee: Buck Werke GmbH & Co., Germany

[21] Appl. No.: 228,309

[22] Filed: Jul. 29, 1988

[30] Foreign Application Priority Data

Jul. 30, 1987 [DE] Germany .............. 37 25 254.2
Oct. 5, 1987 [DE] Germany .............. 37 33 681.9

[51] Int. Cl.$^6$ .............. G01B 11/26; G01C 1/00; G01J 5/00
[52] U.S. Cl. .............. 356/141.2; 250/342; 356/141.5
[58] Field of Search .............. 250/338.1, 339, 341, 250/342; 356/141, 141.2, 141.5

[56] References Cited

U.S. PATENT DOCUMENTS

| | | | |
|---|---|---|---|
| 3,564,257 | 2/1971 | Berry et al. | 356/141 |
| 3,582,970 | 6/1971 | Williams | 250/338.1 |
| 4,094,225 | 6/1978 | Greenwood | 250/342 |
| 4,342,032 | 7/1982 | Roesch et al. | 250/342 |
| 4,710,028 | 12/1987 | Grenier et al. | 356/141 |
| 4,737,028 | 4/1988 | Smith | 250/342 |
| 4,767,209 | 8/1988 | Johnson | 250/342 |
| 4,842,247 | 6/1989 | Kurbitz et al. | 250/342 |

*Primary Examiner*—Stephen C. Buczinski
*Attorney, Agent, or Firm*—Burns, Doane, Swecker & Mathis

[57] ABSTRACT

An infrared search device for the detection and engagement of enemy helicopters is so designed that an IR Sensor in the focal plane of the IR Optics of the search head includes a 2-demensional matrix of point-shaped detector cells. The detector cells operate in a wavelength range of between 3 and 14 um or a fraction thereof. To determine the offset angle of the helicopter from the optical axis of the device, the cells are interrogated individually and in succession by an analysis unit in such a manner that all measurement values are obtained almost simultaneously.

7 Claims, 1 Drawing Sheet

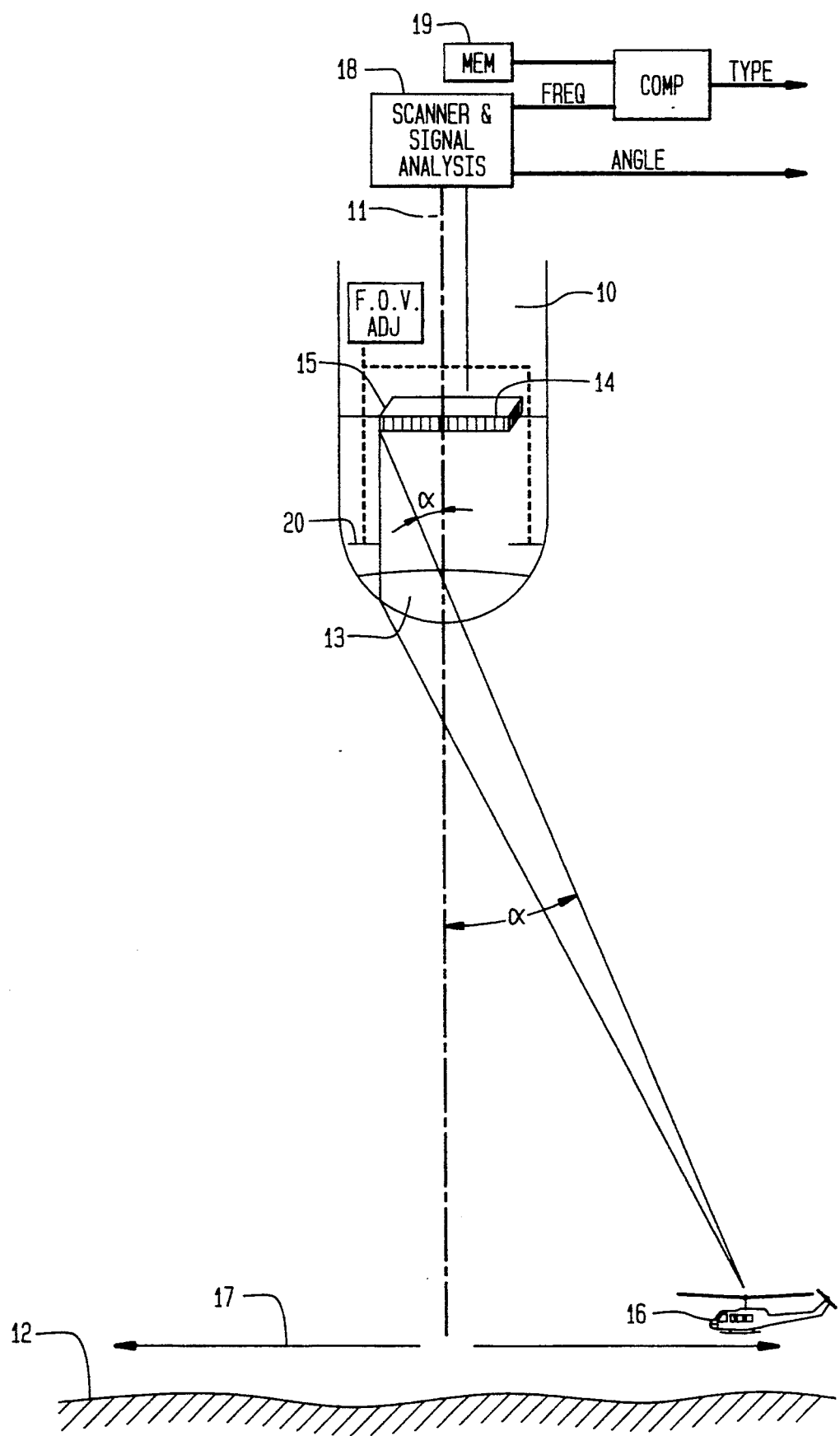

DEVICE WITH INFRARED SEARCH HEAD FOR DETECTION AND ENGAGEMENT OF ENEMY HELICOPTERS

BACKGROUND OF THE INVENTION

The present invention relates to a device for the detection and engagement of enemy helicopters of the type which includes an infrared (IR) search head that is deployed above a helicopter, for example by means of a parachute. The search head contains an infrared sensing unit which detects infrared radiation that is emitted upwardly by the turbine of the helicopter's engine and modulated by the rotor blades. The offset angle of the helicopter, relative to the optical axis of the search head, is determined and used to control combat measures. Such a device is known from published German patent application No. 29 07 249.

In the known devices of this type, a pyroelectric detector or a quadrant detector is used as the sensor. These special detectors are advantageous, on the one hand, because they enable distinctions to be made between the IR radiation coming from the helicopter and the IR radiation from another IR radiation source located in the field of vision of the search head. Specifically, such a distinction can be made because the IR radiation modulated by the rotor blades of the helicopter leads to electrical pulse sequences, i.e., an a.c. component while the IR radiation from the other radiation source leads to a steady or d.c. electrical signal, so that a signal analysis unit only needs to perform analysis of the pulse sequence signals. On the other hand, these detectors are required to determine the direction (azimuth) of the incoming modulated IR radiation and thus the offset angle of the helicopter in order to be able to engage it with corresponding combat measures. While it is possible, with the help of the pyroelectric detector or a quadrant detector, to make a distincition in the signal analysis unit between modulated and unmodulated IR radiation, the sensitivity is too low to be able to measure the helicopter radiation. Pyroelectric detectors, for example, based on barium/strontium/Niobate, have a detection capacity of only $D^* \approx 10^7 - 10^8$ cm $W^{-1} Hz^{\frac{1}{2}}$. Beyond that, it is impossible to determine the type of of helicopter which, as will be explained later, causes a modulation frequency of predetermined magnitude.

Another disadvantage of the known device consists of the fact that both the pyroelectric detector and the quadrant detector only provide a very inaccurate determination of the offset angle, which makes it very difficult to take engagement measures. For example, one cannot perform any precise terminal phase guidance of a missile. In the case of pyroelectric detectors it is hardly possible to obtain a finer gradation of the sensor. While the quadrant detectors could be subdivided into a number of sectors larger that 4, they still do not provide a gradation in the radial direction of the sensor A "fine gradation", and thus a more exact determination of the offset angle of the target helicopter would, of course, be possible with a so-called heat image camera, but it does not provide a distinction between modulated and unmodulated radiation. This is because the individual sensor points are scanned by the signal analysis unit on a line-by-line basis, so that one cannot recognize whether the IR radiation incident upon the individual sensor point is or is not timed. Thus, when a heat image camera is used, there would be a great danger of spotting the wrong targets.

SUMMARY OF THE INVENTION

It is therefore the purpose of this invention to improve helicopter detection devices in such a way that an exact determination, both of the modulation frequency of the IR radiation and of the offset angle of the target, will be possible. The solution to this problem is provided in accordance with the present invention by means of an infrared optical sensing unit having a two-dimensional matrix of point-shaped detector cells disposed at its focal plane. These detector cells are sensitive to light in a wavelength range of 3-15 micrometers, and could be made of CdHgTE, InSb, or the like. These cells are interrogated individually and in succession by a signal analysis unit at such a rate that all measured values are provided almost simultaneously, to thereby enable the offset angle to be readily determined.

In the invention, in other words, a matrix consisting of detector cells, so-called pixels, is arranged in the focal plane of the IR optics whereby these pixels can be interrogated individually by the signal analysis unit almost simultaneously so that the electrical signals, supplied by the pixels, will facilitate both an exact recognition as well as an exact location of a helicopter appearing in the field of vision of the search head. Beyond that—in contrast to the quadrant detector without radial gradation—it is possible with the help of the detector matrix according to the invention to recognize whether the target helicopter is nearby or along the edge of the field of vision so that corresponding measures can be taken, e.g., by expanding the field of vision.

The modulation frequency of incoming IR radiation can, in the process, be determined by the pixel matrix so accurately that one can conclude from the frequency as to what helicopter type one is dealing with, resulting in a friend-foe identification (IFF). In this case, the signal analysis unit preferably includes a memory storing the modulation frequencies of enemy helicopters and a comparison unit for comparing a measured modulation frequency with the stored values.

BRIEF DESCRIPTION OF THE DRAWING

The invention will be described in the following in greater detail with the help of the drawing consisting of a single FIGURE. The drawing is a schematic illustration of the search head of the device and the path of infrared radiation coming from a helicopter appearing in the field of vision of the search head.

DETAILED DESCRIPTION

The number 10 is used to identify the search head in the drawing, specifically, the forward (active) part of that search head. Search head 10 has an optical axis 11 and, at its tip, is provided with IR optics 13 illustrated in the drawing as a convergent lens for the sake of simplicity. In practice, naturally, a multi-part optic, preferably an optic consisting of adjustable reflectors, is used, to which filters, shutters, and the like can be added. A matrix 14, consisting of a plurality of point-shaped detector cells 15, is arranged at the focal plane of optics 13. These detectors cells 15, usually called pixels, respond to a predetermined wavelength range, specifically, to IR radiation between 3 and 14 um, preferably 3 to 5 and/or 8 to 14 um. In practice, matrix 14 can be a square matrix consisting of 16,000 pixels. The pixels preferably consist of CdHgTe or InSb ($D^* \approx 10^{10}$ $-10^{11}$ cm $W^{-1}$ Hz$^{\frac{1}{2}}$) or a material with similar IR sensitivity. The electrial output signals of the individual pixels are supplied to an analysis unit 18, and that analysis unit interrogates the pixels individually almost simultaneously via conventional scanning techniques. The analysis unit should interrogate the pixels at a frequency which is at least 10 times the modulation frequency induced by the helicopter blades. Preferably, the interrogation frequency is around 30 times the modulation frequency. Alternatively, the analysis unit can determine the output signals simultaneously but separately. The analysis by the analysis unit then, first of all, supplies the exact place of the IR radiation source and, next, gives the precise frequency of the radiation modulation (if such a modulation is present).

In the drawing, the search head 10 is aimed from the top at the indicated ground 12, whereby 16 refers to an IR radiation source, specifically, a helicopter, which is within the field of vision 17 of search head 10. Helicopter 16 is in the area of the edge of vision field 17 and is therefore also, including its background radiation, imaged on the corresponding pixel at the edge of matrix 14, as a result of which the radiation, hitting pixel 15, is greater that the radiation found on the neighboring pixels. The analysis unit 18 measures the radiation upon all pixels which are hit by increased radiation, at least until such time as possible modulation in the frequency range that is characteristic for a helicopter, in other words, between 10 and 30 Hz, can be recognized. If such a modulation frequency is recognized, then it is also possible, on the basis of this precisely determined frequency, to determine the helicopter type, because helicopters, within certain limits, fly with a relatively constant rotor rpm, so that the determined modulation frequency pins down the helicopter type which, in turn, facilitates IFF. To this end, a memory unit 19 can be associated with the signal analysis unit 18 and store the frequency signatures of enemy helicopters. The signal analysis unit can compare the signatures stored in the memory unit 19 with the particular modulation frequency that has been detected to determine whether an enemy helicopter is within the field of view.

The position of the particular pixel upon which IR modulation was determined gives the target information. In other words, using standard trigonometric principles, the offset angle of target helicopter 16 from the optical axis 11 can be measured. After the identificaton and location of the target helicopter are determined, combat engagement measures can be initiated. For example, the search head can be part of a missile which—after jettisoning the parachute and after possible additional ignition of the rocket motor, with further guidance, for example, proportional guidance by the search head—will plunge upon the target helicopter. Another possiblity is to have the search head, via radio, ignite a rocket on the ground and to have it guided to the target helicopter by means of the search head.

To prevent the situation where, as the search head descends, the target helicopter might vanish from the field of vision because of the necessarily resulting shrinkage of the field of vision, it is a good idea to design the IR optics in such a way that their field of vision will automatically become larger as the parachute descends. This can be done by a customary mechanism, such as a diaphragm 20.

Naturally, the illustrated device can be subjected to numerous changes without going beyond the scope of the invention as such. This thought particularly applies with regard to the size of the detector matrix and the number of matrix detector cells, as well as the particular design of the IR optics and the analysis unit.

I claim:

1. An infrared search head that is designed to locate and engage enemy helicopters from above by detecting modulated infrared radiation given off by a helicopter and determining an offset angle of the helicopter with respect to an optical axis, comprising:

an infrared optical unit having an optical axis and defining a focal plane;

an infrared sensing unit comprised of a two-dimensional matrix of thousands of point-shaped detector cells having a sensitivity to infrared radiation in the wavelength range of 3-14 micrometers and having a detection capacity D* of at least $10^{10}$ cm $W^{-1}$ Hz$^{\frac{1}{2}}$ for converting incident infrared radiation into electrical signals; and a signal analysis unit for measuring the amplitudes of the electrical signals generated by said detector cells individually and in succession at a rate that is sufficiently fast to determine the frequency of modulation of the electrical signals generated by said detector cells, to thereby determine the offset angle of a helicopter relative to said optical axis.

2. The infrared search head of claim 1 wherein said detector cells are made,of one of the materials CdHgTe or InSb.

3. The infrared search head of claim 1 further including a memory unit connected to said signal analysis unit and storing values of modulation frequencies associated with enemy helicopters, wherein said signal analysis unit measures the modulation frequency of received infrared radiation and compares this measured frequency with the values stored in said memory unit.

4. The infrared search head of claim 1 further including means for adjusting the field of view of said optical unit.

5. The infrared search head of claim 1 wherein said detector cells are sensitive to radiation having a wavelenth in the range of 3-5 micrometers.

6. The infrared search head of claim 1 wherein said signal analysis unit interrogates said detector cells at a frequency which is at least 10 times the frequency of said electrical signals.

7. The infrared search head of claim 6 wherein said interrogation frequency is about 30 times the frequency of said electrical signals.

* * * * *